(12) United States Patent
Tazaki et al.

(10) Patent No.: US 6,924,491 B2
(45) Date of Patent: Aug. 2, 2005

(54) STIMULABLE PHOSPHOR PANEL (75) Inventors: Seiji Tazaki, Kaisei-machi (JP); Hiroshi Ogawa, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 222 days.

(21) Appl. No.: 10/611,662

(22) Filed: Jul. 2, 2003

(65) Prior Publication Data
US 2004/0041109 A1 Mar. 4, 2004

(30) Foreign Application Priority Data
Jul. 3, 2002 (JP) ........................................ 2002-194306

(51) Int. Cl.[7] ............................ G01T 1/05; G03B 42/08
(52) U.S. Cl. ...................... 250/484.4; 250/581; 250/584
(58) Field of Search .............................. 250/484.4, 580, 250/581, 582, 584, 586, 587

(56) References Cited

U.S. PATENT DOCUMENTS 5,804,832 A * 9/1998 Crowell et al. ............. 250/580
6,252,243 B1 * 6/2001 Isoda et al. ................. 250/581
6,282,264 B1 * 8/2001 Smith et al. ................. 378/189
6,713,776 B2 * 3/2004 Takahashi ................... 250/582

* cited by examiner

Primary Examiner—David Porta
Assistant Examiner—Faye Polyzos
(74) Attorney, Agent, or Firm—Sughrue Mion, PLLC (57) ABSTRACT A stimulable phosphor panel comprises a support plate, and a stimulable phosphor layer, which is overlaid on the support plate. The stimulable phosphor panel is provided with position adjusting members, each of which has a position adjusting reference surface for adjustment of a position of the stimulable phosphor panel at the time of an operation for locating the stimulable phosphor panel in a radiation image read-out apparatus, such that the position adjusting members are capable of being displaced. A spacing between the position adjusting reference surface of each of the position adjusting members and a surface of the stimulable phosphor layer is capable of being adjusted with an operation for displacing each of the position adjusting members.

10 Claims, 10 Drawing Sheets

STIMULABLE PHOSPHOR PANEL

BACKGROUND OF THE INVENTION

1. Field of the Invention

This invention relates to a stimulable phosphor panel. This invention particularly relates to a stimulable phosphor panel, which is to be located in a radiation image read-out apparatus and from which a radiation image is to be read out.

2. Description of the Related Art

Radiation image recording and reproducing systems comprising radiation image recording apparatuses, radiation image read-out apparatuses, and the like, in which stimulable phosphors are utilized, have heretofore been known as computed radiography (CR) systems. With the CR systems, a radiation image of an object, such as a human body, is recorded as a latent image on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during exposure of the stimulable phosphor sheet to the radiation. The light emitted by the stimulable phosphor sheet, upon stimulation thereof, is photoelectrically detected and converted into an electric image signal. In this manner, the image signal representing the radiation image of the object is acquired.

As a recording medium to be used in the radiation image recording and reproducing systems described above, a stimulable phosphor panel, which comprises a support plate and a stimulable phosphor layer overlaid on the support plate, has heretofore been known. After the stimulable phosphor panel, on which a radiation image has been stored, has been subjected to a radiation image read-out operation for reading out the radiation image from the stimulable phosphor panel, erasing light may be irradiated to the stimulable phosphor panel in order to release energy remaining on the stimulable phosphor layer of the stimulable phosphor panel. The thus erased stimulable phosphor panel is capable of being used again for the recording of a radiation image. The stimulable phosphor panel is thus capable of being used repeatedly for the recording and the readout of a radiation image.

As an apparatus for performing the radiation image recording operation and the radiation image read-out operation, a radiation image recording and read-out apparatus, which comprises both the radiation image recording apparatus and the radiation image read-out apparatus, has heretofore been known. In the radiation image recording and read-out apparatus, the stimulable phosphor panel is secured to an apparatus main body, and the radiation image recording operation and the radiation image read-out operation are performed iterately on the stimulable phosphor panel. After the stimulable phosphor panel located in the radiation image recording and read-out apparatus has been used for a long period, the radiation image recording performance and the light emission performance of the stimulable phosphor panel become bad. Therefore, the stimulable phosphor panel is periodically changed over to a new stimulable phosphor panel.

In cases where the stimulable phosphor panel located in the radiation image recording and read-out apparatus is changed over to a new stimulable phosphor panel, the change-over operation is performed at a site at which the radiation image recording and read-out apparatus is operating. Therefore, it is desired that the change-over operation is capable of being performed quickly.

However, it is necessary that a new stimulable phosphor panel be located accurately at a predetermined position within the radiation image recording and read-out apparatus. (For example, it is necessary that a surface of the stimulable phosphor layer of the stimulable phosphor panel be located with an accuracy within the range of ±25 μm with respect to a predetermined reference position.) However, for reasons of producing processes, dimensions of the stimulable phosphor panel vary for different stimulable phosphor panels. Therefore, the position adjustment described above is performed with respect to each of different stimulable phosphor panels. Accordingly, the problems occur in that a long time is required to perform the position adjustment.

The problems described above are encountered commonly to radiation image read-out apparatuses, in which the stimulable phosphor panel is located, and a radiation image is read out from the stimulable phosphor panel.

SUMMARY OF THE INVENTION

The primary object of the present invention is to provide a stimulable phosphor panel, which is capable of being located quickly at a predetermined position in a radiation image read-out apparatus.

The present invention provides a stimulable phosphor panel, comprising:

i) a support plate, and ii) a stimulable phosphor layer, which is overlaid on the support plate, the stimulable phosphor panel being adapted to be located in a radiation image read-out apparatus capable of performing a radiation image read-out operation for reading out a radiation image, which has been stored on the stimulable phosphor layer of the stimulable phosphor panel, wherein the stimulable phosphor panel is provided with position adjusting members, each of which has a position adjusting reference surface for adjustment of a position of the stimulable phosphor panel at the time of an operation for locating the stimulable phosphor panel in the radiation image read-out apparatus, such that the position adjusting members are capable of being displaced, and a spacing between the position adjusting reference surface of each of the position adjusting members and a surface of the stimulable phosphor layer is capable of being adjusted with an operation for displacing each of the position adjusting members.

The stimulable phosphor panel in accordance with the present invention may be modified such that the stimulable phosphor panel is adapted to be located in the radiation image read-out apparatus, which is constituted as a radiation image recording and read-out apparatus capable of performing both the radiation image read-out operation and a radiation image recording operation for recording the radiation image on the stimulable phosphor panel located in the radiation image read-out apparatus. Specifically, the radiation image read-out apparatus maybe an exclusive radiation image read-out apparatus for reading out the radiation image from the stimulable phosphor panel. Alternatively, the radiation image read-out apparatus may be the radiation image recording and read-out apparatus capable of recording the radiation image on the stimulable phosphor panel and reading out the radiation image from the stimulable phosphor panel.

Here, the structure wherein a stimulable phosphor layer is overlaid on a support plate describes, for example, cases in which:

(1) the stimulable phosphor layer is formed directly on the support plate; and (2) the stimulable phosphor layer is formed on a separate intermediary support plate, which is then adhesively attached to the support plate.

However, the present invention is not limited to the above structures, and includes all cases wherein at least a stimulable phosphor is overlaid on a support plate.

With the stimulable phosphor panel in accordance with the present invention, the stimulable phosphor panel is provided with the position adjusting members, each of which has the position adjusting reference surface for the adjustment of the position of the stimulable phosphor panel at the time of the operation for locating the stimulable phosphor panel in the radiation image read-out apparatus, such that the position adjusting members are capable of being displaced. Also, the spacing between the position adjusting reference surface of each of the position adjusting members and the surface of the stimulable phosphor layer is capable of being adjusted with the operation for displacing each of the position adjusting members. Therefore, in cases where the spacing between the position adjusting reference surface of each of the position adjusting members and the surface of the stimulable phosphor layer is adjusted previously, a particular operation for adjusting the position of the stimulable phosphor panel at a predetermined position in the radiation image read-out apparatus need not be performed, and the stimulable phosphor panel is capable of being easily located in the radiation image read-out apparatus. Accordingly, the operation for locating the stimulable phosphor panel at the predetermined position in the radiation image read-out apparatus is capable of being performed quickly.

DESCRIPTION OF THE PREFERRED EMBODIMENTS

The present invention will hereinbelow be described in further detail with reference to the accompanying drawings.

Figure 1A:
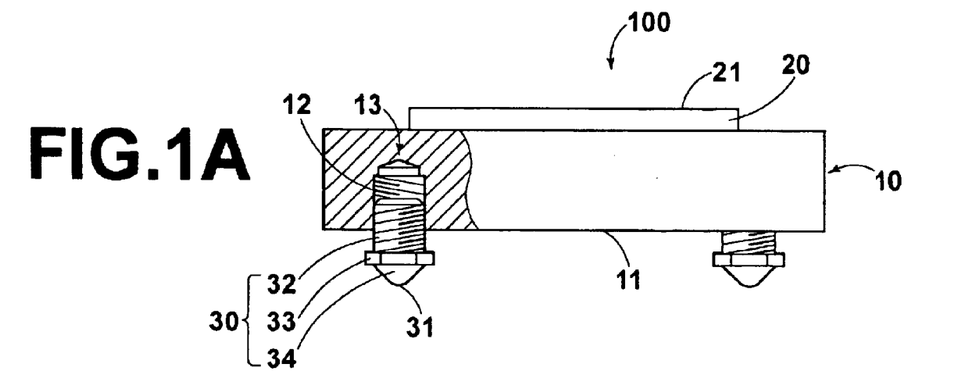
FIG. 1A is a side view showing an embodiment of the stimulable phosphor panel in accordance with the present invention.
Figure 1B:
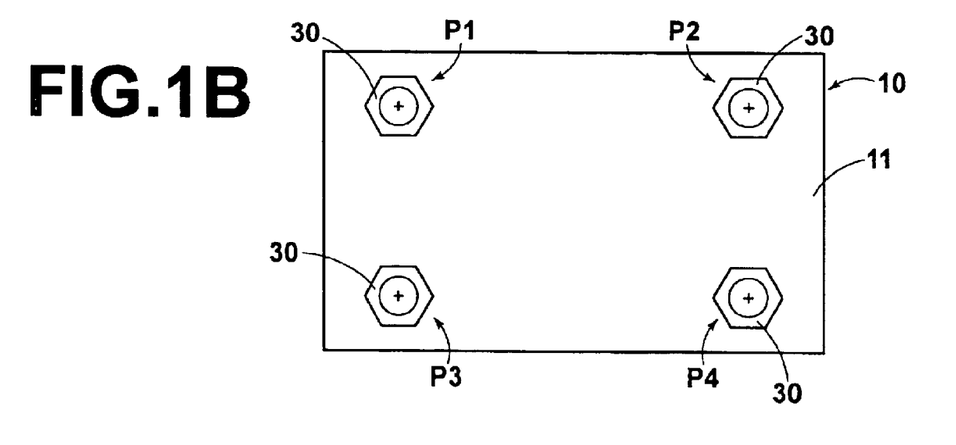
FIG. 1B is a bottom view showing the stimulable phosphor panel of FIG. 1A.
Figure 2A:
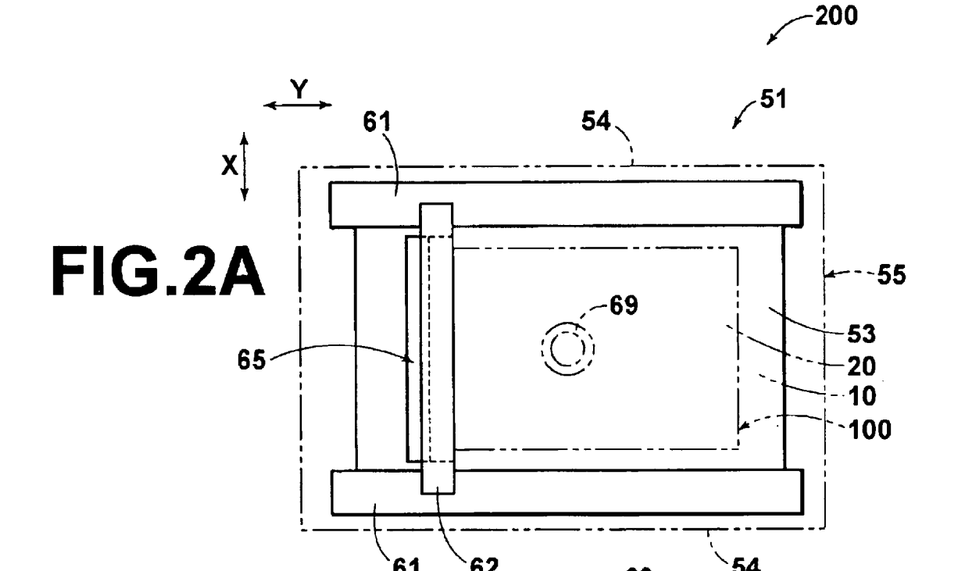
FIG. 2A is a plan view showing a radiation image recording and read-out apparatus, in which the stimulable phosphor panel of FIG. 1A is located.
Figure 2B:
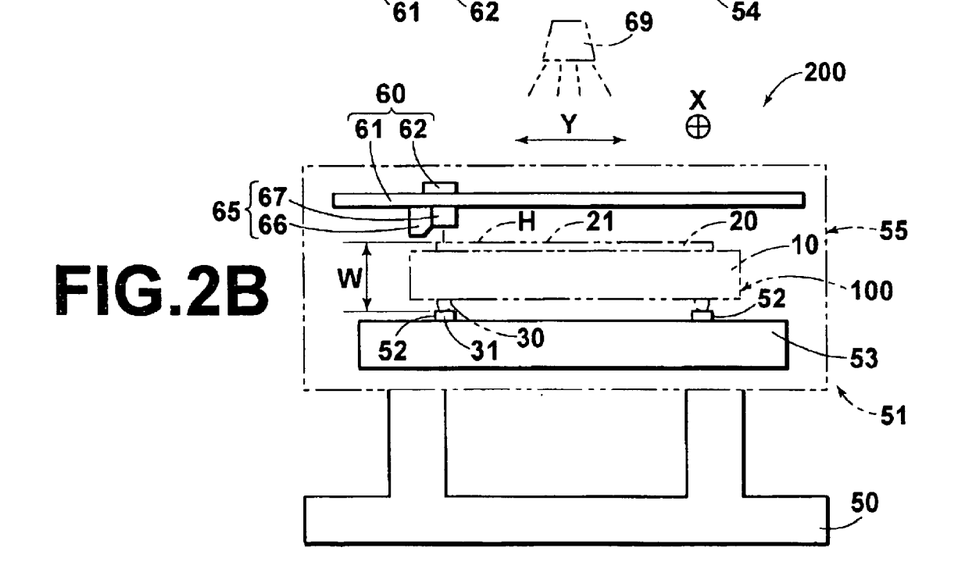
FIG. 2B is a side view showing the radiation image recording and read-out apparatus of FIG. 2A.
Figure 3:
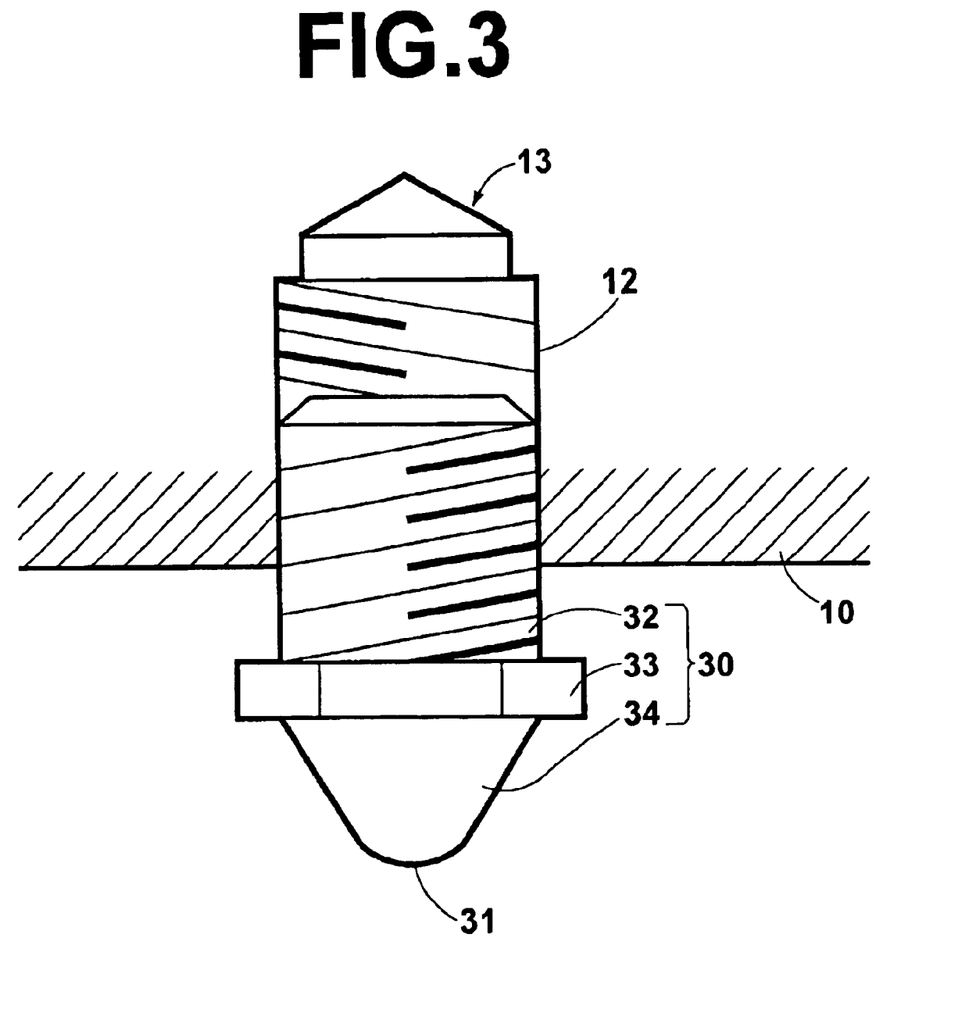
FIG. 3 is an enlarged sectional view showing how an external thread section of a position adjusting member is engaged with an internal thread section of a support plate of the stimulable phosphor panel.
Figure 4:
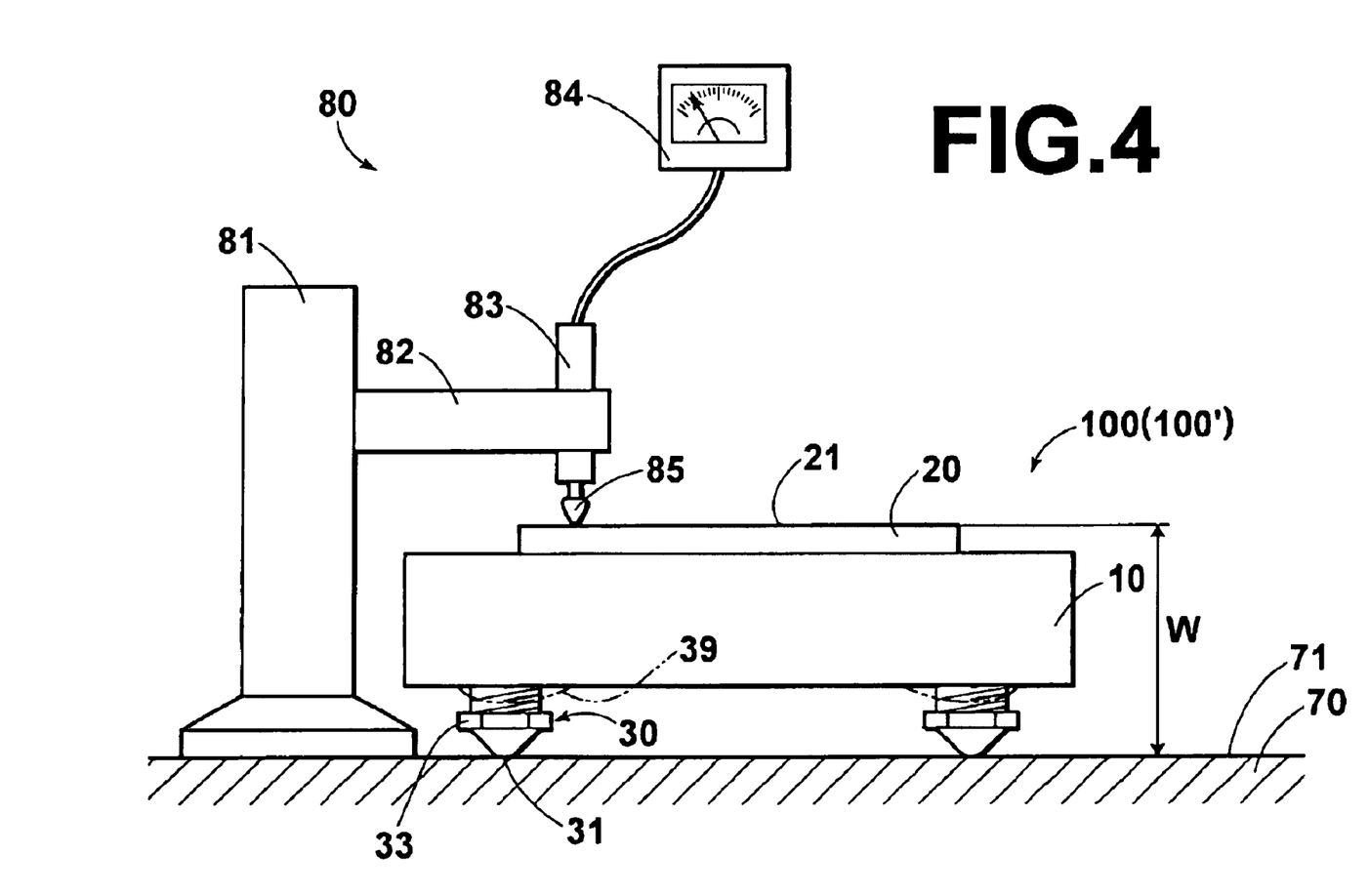
FIG. 4 is a side view showing how a spacing between a surface of a stimulable phosphor layer of the stimulable phosphor panel and a position adjusting reference surface of each of position adjusting members is adjusted at a predetermined spacing.
Figure 5A:
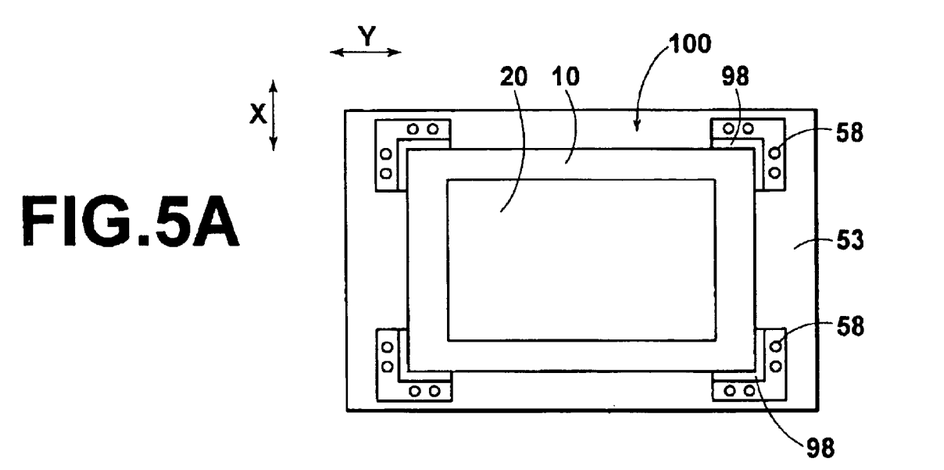
FIG. 5A is a plan view showing the stimulable phosphor panel having been located on a base of the radiation image recording and read-out apparatus.
Figure 5B:
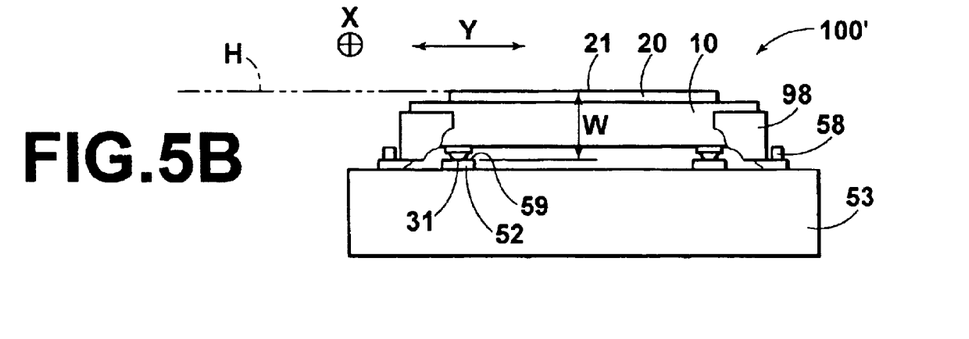
FIG. 5B is a side view showing the stimulable phosphor panel having been located on the base of the radiation image recording and read-out apparatus.
Figure 6:
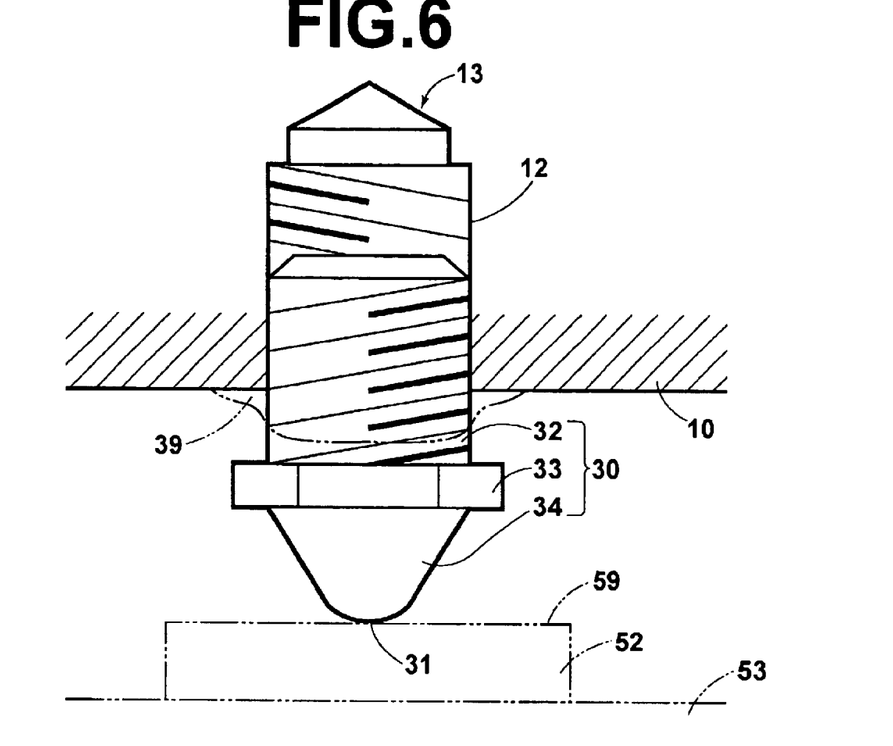
FIG. 6 is an enlarged side view showing how the position adjusting reference surface of the position adjusting member is supported by a receiving section of the base of the radiation image recording and read-out apparatus.

FIG. 1A is a side view showing an embodiment of the stimulable phosphor panel in accordance with the present invention. FIG. 1B is a bottom view showing the stimulable phosphor panel of FIG. 1A. FIG. 2A is a plan view showing a radiation image recording and read-out apparatus, in which the stimulable phosphor panel of FIG. 1A is located. FIG. 2B is a side view showing the radiation image recording and read-out apparatus of FIG. 2A. FIG. 3 is an enlarged sectional view showing how an external thread section of a position adjusting member is engaged with an internal thread section of a support plate of the stimulable phosphor panel. FIG. 4 is a side view showing how a spacing between a surface of a stimulable phosphor layer of the stimulable phosphor panel and a position adjusting reference surface of each of position adjusting members is adjusted at a predetermined spacing. FIG. 5A is a plan view showing the stimulable phosphor panel having been located on a base of the radiation image recording and read-out apparatus. FIG. 5B is a side view showing the stimulable phosphor panel having been located on the base of the radiation image recording and read-out apparatus. FIG. 6 is an enlarged side view showing how the position adjusting reference surface of the position adjusting member is supported by a receiving section of the base of the radiation image recording and read-out apparatus.

As illustrated in FIGS. 1A, 1B and FIGS. 2A, 2B, a stimulable phosphor panel 100, which is an embodiment of the stimulable phosphor panel in accordance with the present invention, comprises a support plate 10 and a stimulable phosphor layer 20 overlaid on the support plate 10. The stimulable phosphor panel 100 is adapted to be located in a radiation image recording and read-out apparatus 200, which will be described later, for recording a radiation image on the stimulable phosphor layer 20 of the stimulable phosphor panel 100 and reading out the radiation image, which has been stored on the stimulable phosphor layer 20.

The stimulable phosphor panel 100 is provided with a plurality of (in this embodiment, four) position adjusting members 30, 30, ..., which are capable of being displaced. Each of the position adjusting members 30, 30, ... has a position adjusting reference surface 31, which acts as a reference surface for the adjustment of the position of the stimulable phosphor panel 100 at the time of an operation for locating the stimulable phosphor panel 100 in the radiation image recording and read-out apparatus 200. The spacing between the position adjusting reference surface 31 of each of the position adjusting members 30, 30, ... and a surface 21 of the stimulable phosphor layer 20 of the stimulable phosphor panel 100 is capable of being adjusted with an operation for displacing each of the position adjusting members 30, 30, ... with respect to the support plate 10 of the stimulable phosphor panel 100.

As illustrated in detail in FIG. 3, each of the position adjusting members 30, 30, ... comprises an external thread section 32, which has a circular cylinder-like shape as a whole and has external threads formed on the outer circumferential surface of the circular cylinder-like shape. The position adjusting member 30 also comprises a nut section 33, which is secured to the lower part of the external thread section 32 and acts as an aid in rotating the position adjusting member 30. The position adjusting member 30 further comprises a bottom surface section 34, which has a gentle, convex curved surface at the bottom part of the circular cylinder-like shape with respect to the cylinder axis direction. At the time at which the stimulable phosphor panel 100 is located in the radiation image recording and read-out apparatus 200, the bottom end face of the bottom surface section 34 is brought into contact with a receiving section 52 of a base 53 of the radiation image recording and read-out apparatus 200, which receiving section will be described later. The bottom end face of the bottom surface section 34 acts as the position adjusting reference surface 31.

The support plate 10 of the stimulable phosphor panel 100 has four internally threaded holes 13, 13, ..., which are open at a bottom surface 11 of the support plate 10. Each of the internally threaded holes 13, 13, ... is provided with an internal thread section 12, which has internal threads formed on the inner circumferential surface of the internally threaded hole 13. The internal thread section 12 of the internally threaded hole 13 of the support plate 10 is engaged with the external thread section 32 of the position adjusting member 30. The internally threaded holes 13, 13, ... are located at four points (P1, P2, P3, and P4), which are spaced from one another, on the bottom surface 11 of the support plate 10. Each of the internally threaded holes 13, 13, ... is engaged with one of the position adjusting members 30, 30, ...

As illustrated in FIGS. 2A and 2B, the radiation image recording and read-out apparatus 200 comprises a pedestal 50 and an apparatus main body 51, which is supported on the pedestal 50. The apparatus main body 51 comprises the base 53 having four receiving sections 52, 52, ... When the stimulable phosphor panel 100 is located in the apparatus main body 51, the position adjusting reference surface 31 of each of the four position adjusting members 30, 30, ..., which have been engaged with the internally threaded holes 13, 13, ... of the support plate 10, is brought into abutment with one of the receiving sections 52, 52, ... of the base 53.

The apparatus main body 51 also comprises sub-scanning means 60 for moving read-out means 65, which will be described later, in a sub-scanning direction indicated by the double headed arrow Y. The apparatus main body 51 further comprises the read-out means 65, which is located on the sub-scanning means 60. The read-out means 65 detects light, which is emitted by the stimulable phosphor panel 100 having been located in the apparatus main body 51 when stimulating rays are irradiated to the stimulable phosphor panel 100. The read-out means 65 thus reads out the radiation image having been stored on the stimulable phosphor panel 100. The radiation image recording and read-out apparatus 200 also comprises a radiation irradiating section 69, which acts as recording means for recording the radiation image on the stimulable phosphor layer 20 of the stimulable phosphor panel 100.

The sub-scanning means 60 comprises a pair of scanning rails 61, 61, each of which extends in the sub-scanning direction and is secured to one of side surfaces 54, 54 of a casing 55 of the apparatus main body 51. The sub-scanning means 60 also comprises a moving base 62 capable of moving on the scanning rails 61, 61. The sub-scanning means 60 further comprises driving means (not shown) for moving the moving base 62 in the sub-scanning direction. With the driving means, the read-out means 65 located on the moving base 62 is moved in the sub-scanning direction.

The read-out means 65 comprises a stimulating ray source 66 for producing linear stimulating rays. The produced linear stimulating rays are irradiated to the stimulable phosphor panel 100 having been located in the apparatus main body 51. The linear stimulating rays extend in a main scanning direction indicated by the double headed arrow X, which direction is normal to the sub-scanning direction. The read-out means 65 also comprises line detecting means 67 for detecting light, which is emitted in a linear pattern by the stimulable phosphor panel 100 when the linear stimulating rays having been produced by the stimulating ray source 66 are irradiated to the stimulable phosphor panel 100. While the read-out means 65 is being moved in the sub-scanning direction by the sub-scanning means 60, the linear stimulating rays, which have been produced by the stimulating ray source 66, are irradiated to the stimulable phosphor panel 100, and the light emitted by the stimulable phosphor panel 100 is detected by the line detecting means 67. In this manner, the read-out means 65 reads out the two-dimensional radiation image, which has been stored on the stimulable phosphor layer 20 of the stimulable phosphor panel 100.

How the stimulable phosphor panel 100 is located in the radiation image recording and read-out apparatus 200 will be described hereinbelow.

As illustrated in FIG. 4, in order for the spacing between the position adjusting reference surface 31 of each of the position adjusting members 30, 30, ... and the surface 21 of the stimulable phosphor layer 20 of the stimulable phosphor panel 100 to be adjusted at the spacing having been determined previously with respect to the radiation image recording and read-out apparatus 200, the stimulable phosphor panel 100 is placed on a reference plane 71 of a reference bed 70, which is located at a site different from the site of the radiation image recording and read-out apparatus 200. The reference plane 71 of the reference bed 70 has an accurate flatness (e.g., a flatness of ±5 $\mu$m).

Thereafter, a spacing measuring device 80 for measuring the spacing between the reference plane 71 of the reference bed 70 and the surface 21 of the stimulable phosphor layer 20 of the stimulable phosphor panel 100 is prepared. With the spacing measuring device 80, the spacing between the reference plane 71 of the reference bed 70 and the surface 21 of the stimulable phosphor layer 20 of the stimulable phosphor panel 100, i.e. the spacing between the position adjusting reference surface 31 of each of the position adjusting members 30, 30, . . . and the surface 21 of the stimulable phosphor layer 20 of the stimulable phosphor panel 100, is measured at various positions on the stimulable phosphor layer 20. The spacing measuring device 80 comprises a stand 81. The spacing measuring device 80 also comprises an arm 82, which extends horizontally from the stand 81. The spacing measuring device 80 further comprises a length measuring head 83, which is supported at the end area of the arm 82. The spacing measuring device 80 still further comprises a display device 84 for displaying the results of the measurement performed by the length measuring head 83.

The measurement with the spacing measuring device 80 is performed in the manner described below. Specifically, firstly, the stand 81 of the spacing measuring device 80 is located on the reference plane 71 of the reference bed 70. Also, a probe 85 of the length measuring head 83, which is supported at the end area of the arm 82, is brought into contact with the surface 21 of the stimulable phosphor layer 20 of the stimulable phosphor panel 100. In this state, error of the spacing between the reference plane 71 of the reference bed 70 and the surface 21 of the stimulable phosphor layer 20 of the stimulable phosphor panel 100 (i.e., error with respect to the predetermined spacing) is measured. The spacing measuring device 80 is adjusted previously such that, in cases where the result of the measurement performed by the length measuring head 83 is ±0, the spacing between the reference plane 71 of the reference bed 70 and the surface 21 of the stimulable phosphor layer 20 of the stimulable phosphor panel 100 is equal to the predetermined spacing.

Thereafter, the nut section 33 of the position adjusting member 30 is operated, and the position adjusting member 30 is thereby rotated. With the rotation of the position adjusting member 30, a spacing W between the reference plane 71 of the reference bed 70 and the surface 21 of the stimulable phosphor layer 20 of the stimulable phosphor panel 100, i.e. the spacing W between the position adjusting reference surface 31 of the position adjusting member 30 and the surface 21 of the stimulable phosphor layer 20 of the stimulable phosphor panel 100, is adjusted to be equal to the predetermined spacing described above. The adjustment is performed with respect to each of the position adjusting members 30, 30, . . . , which are located at the four positions described above (P1, P2, P3, and P4 as illustrated in FIG. 1B).

After the adjustment of the spacing W described above has been performed, each of the position adjusting members 30, 30, . . . is secured to the support plate 10 by use of an adhesive agent 39. In this manner, a stimulable phosphor panel 100', in which the position adjusting members 30, 30, . . . and the support plate 10 have been combined into an integral body, and in which the position adjusting members 30, 30, . . . have been set such that the spacing W between the position adjusting reference surface 31 of each of the position adjusting members 30, 30, . . . and the surface 21 of the stimulable phosphor layer 20 coincides with the predetermined spacing, is obtained.

Thereafter, the stimulable phosphor panel 100', in which the position adjusting members 30, 30, . . . have been set in the manner described above, is conveyed to the site at which the radiation image recording and read-out apparatus 200 is located. Also, the stimulable phosphor panel 100' is located in the radiation image recording and read-out apparatus 200.

FIGS. 5A and 5B illustrate only the part in the vicinity of the base 53 of the radiation image recording and read-out apparatus 200. As illustrated in FIGS. 5A, 5B, and FIG. 6, the stimulable phosphor panel 100' is located on the base 53 of the radiation image recording and read-out apparatus 200, such that the support plate 10 of the stimulable phosphor panel 100' is supported by receiving surfaces 59, 59, . . . of the receiving sections 52, 52, . . . via the position adjusting reference surfaces 31, 31, . . . of the four position adjusting members 30, 30, . . . , which have been secured to the support plate 10.

After the stimulable phosphor panel 100' has been located on the base 53 of the radiation image recording and read-out apparatus 200, the four corner areas of the stimulable phosphor panel 100' are supported by side plates 98, 98, . . . such that the stimulable phosphor panel 100' does not shift in the main scanning direction, which is indicated by the double headed arrow X in FIG. 5A, and in the sub-scanning direction, which is indicated by the double headed arrow Y in FIG. 5A. Each of the side plates 98, 98, . . . is secured by screws 58, 58, . . . to the base 53 of the radiation image recording and read-out apparatus 200.

As illustrated in FIG. 2B, the radiation image recording and read-out apparatus 200 has been set previously such that a plane H, which is located above the receiving surface 59 of each of the receiving sections 52, 52, . . . at the spacing W from the receiving surface 59 of each of the receiving sections 52, 52, . . . , constitutes the surface for the readout of the radiation image performed by the read-out means 65. Therefore, at the time at which the stimulable phosphor panel 100' is located on the base 53 of the radiation image recording and read-out apparatus 200, the adjustment of the spacing described above need not be performed, and the position of the surface 21 of the stimulable phosphor layer 20 of the stimulable phosphor panel 100' is capable of being set so as to coincide with the position of the surface for the readout of the radiation image performed by the read-out means 65.

Also, the radiation image recording and read-out apparatus 200 has been set previously such that the position of the surface for the readout of the radiation image and the position of a recording surface for the recording of the radiation image on the stimulable phosphor layer 20 coincide with each other. Therefore, in cases where the position of the surface 21 of the stimulable phosphor layer 20 of the stimulable phosphor panel 100' is set so as to coincide with the position of the surface for the readout of the radiation image in the radiation image recording and read-out apparatus 200, the position of the surface 21 of the stimulable phosphor layer 20 of the stimulable phosphor panel 100' and the position of the recording surface for the recording of the radiation image, which recording is performed with the radiation irradiating section 69 of the radiation image recording and read-out apparatus 200 and on the stimulable phosphor layer 20, coincide with each other.

In the manner described above, the operation for locating the stimulable phosphor panel 100' in the radiation image recording and read-out apparatus 200 is completed. In this state, the operation for reading out the two-dimensional radiation image, which has been stored on the stimulable phosphor layer 20 of the stimulable phosphor panel 100', with the read-out means 65 is capable of being performed.

As described above, with the stimulable phosphor panel in accordance with the present invention, the operation for locating the stimulable phosphor panel at the predetermined position in the radiation image recording and read-out apparatus is capable of being performed quickly.

Figure 7:
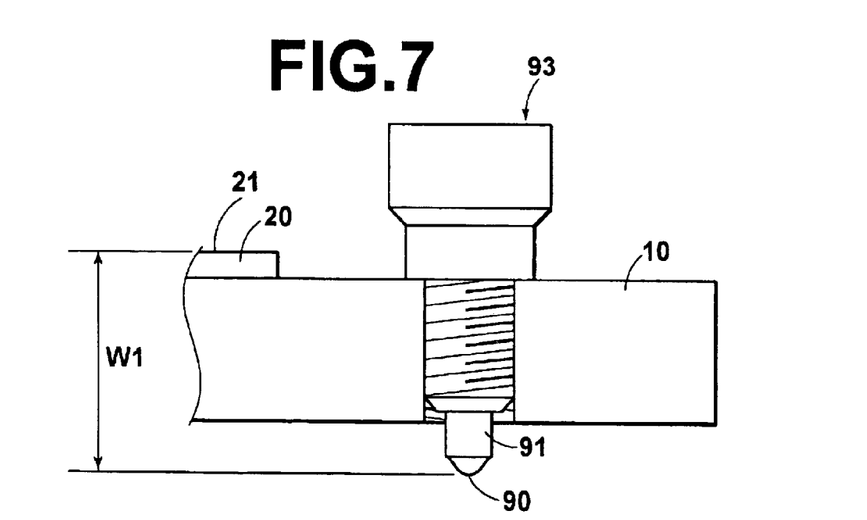
FIG. 7 is a side view showing a different example of a position adjusting member, which is constituted of a micrometer head fitted to the support plate of a stimulable phosphor panel.

FIG. 7 is a side view showing a different example of a position adjusting member, which is constituted of a micrometer head fitted to the support plate of a stimulable phosphor panel. As illustrated in FIG. 7, each of the position adjusting members described above may be constituted of a micrometer head 93, which is provided with a position adjusting reference surface 90 at an end of a shaft 91. In such cases, the shaft 91 is displaced by the micrometer head 93, and a spacing WI between the surface 21 of the stimulable phosphor layer 20 and the position adjusting reference surface 90 is thereby adjusted.

Figure 8:
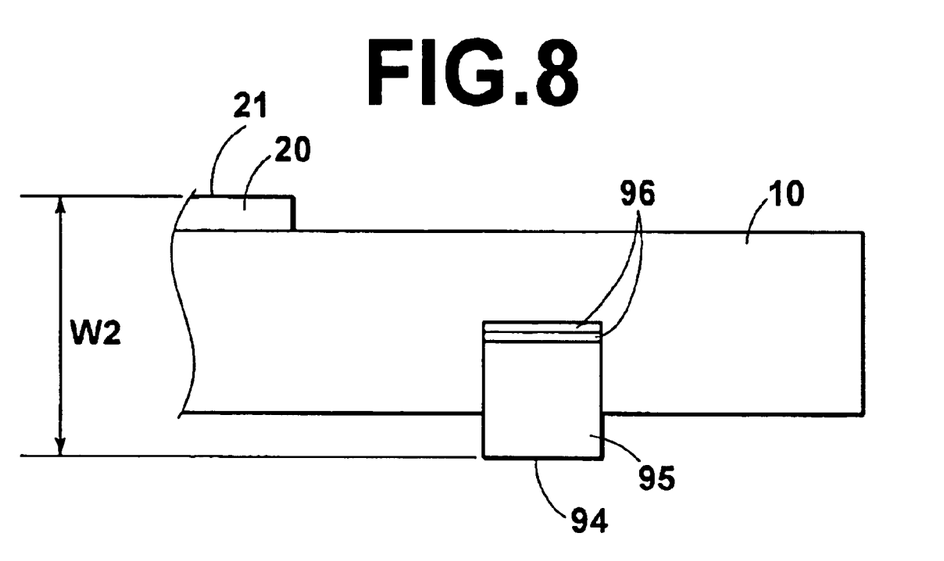
FIG. 8 is a side view showing a further different example of a position adjusting member, which is constituted of a cylindrical block fitted to the support plate of a stimulable phosphor panel.

FIG. 8 is a side view showing a further different example of a position adjusting member, which is constituted of a cylindrical block fitted to the support plate of a stimulable phosphor panel. As illustrated in FIG. 8, each of the position adjusting members described above may be constituted of a cylindrical block 95, which is provided with a position adjusting reference surface 94 at an end face. In such cases, the thicknesses of spacers 96, 96, which are inserted between the cylindrical block 95 and the support plate 10, are altered, and a spacing W2 between the surface 21 of the stimulable phosphor layer 20 and the position adjusting reference surface 94 is thereby adjusted.

In order for the spacing between the surface 21 of the stimulable phosphor layer 20 and the position adjusting reference surface 90 to be adjusted, one of various techniques may be employed. For example, the spacing described above may be adjusted with a technique, in which a piston of a piston-cylinder mechanism is driven hydraulically or pneumatically.

Figure 9A:
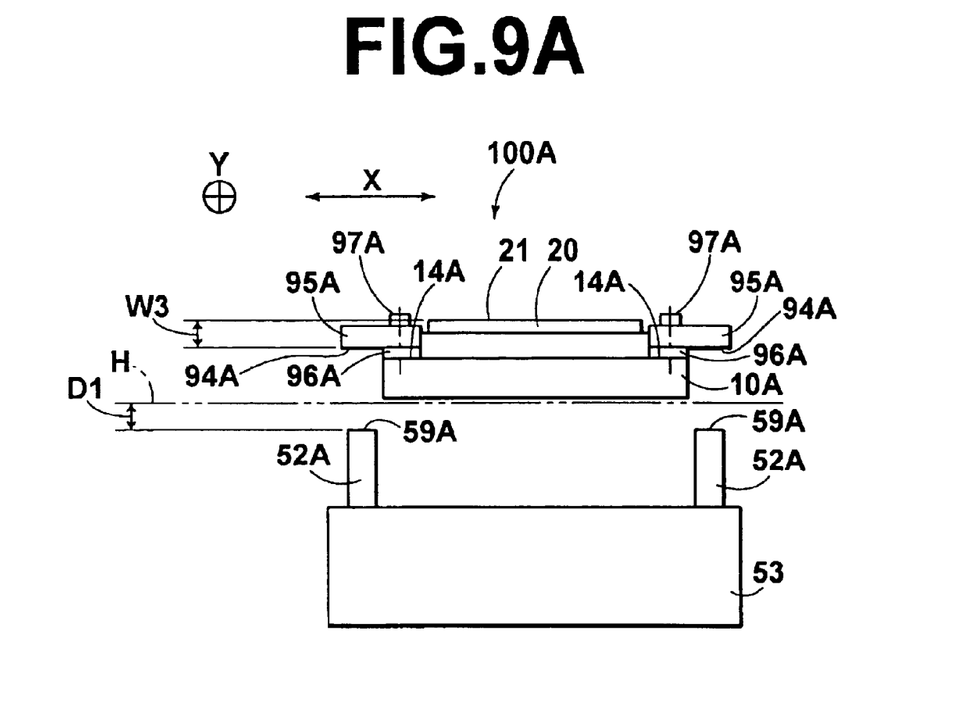
FIG. 9A is a front view showing a state of a different embodiment of the stimulable phosphor panel in accordance with the present invention before being located on a base of a radiation image recording and read-out apparatus.
Figure 9B:
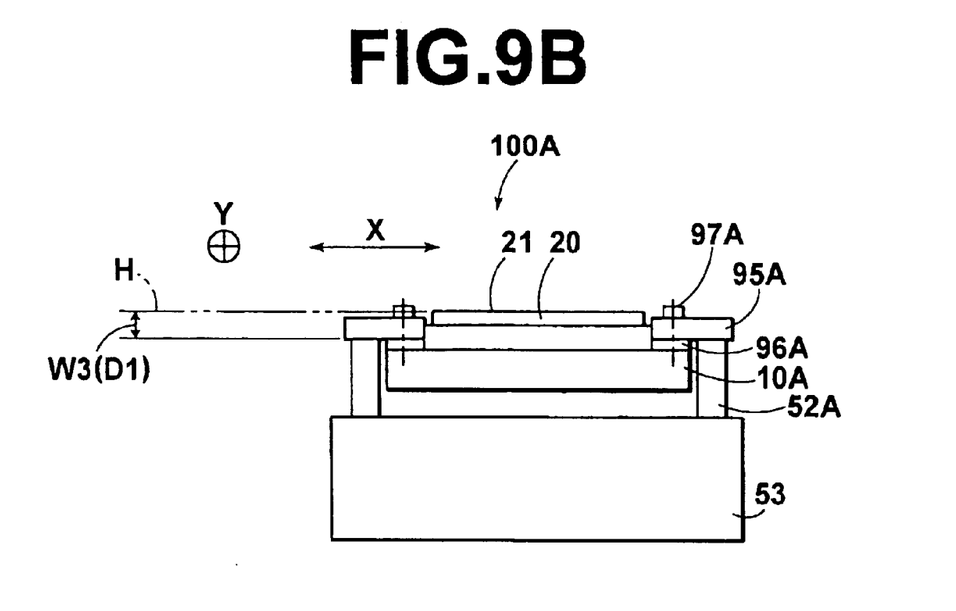
FIG. 9B is a front view showing a state of the different embodiment of the stimulable phosphor panel in accordance with the present invention after being located on the base of the radiation image recording and read-out apparatus.
Figure 10:
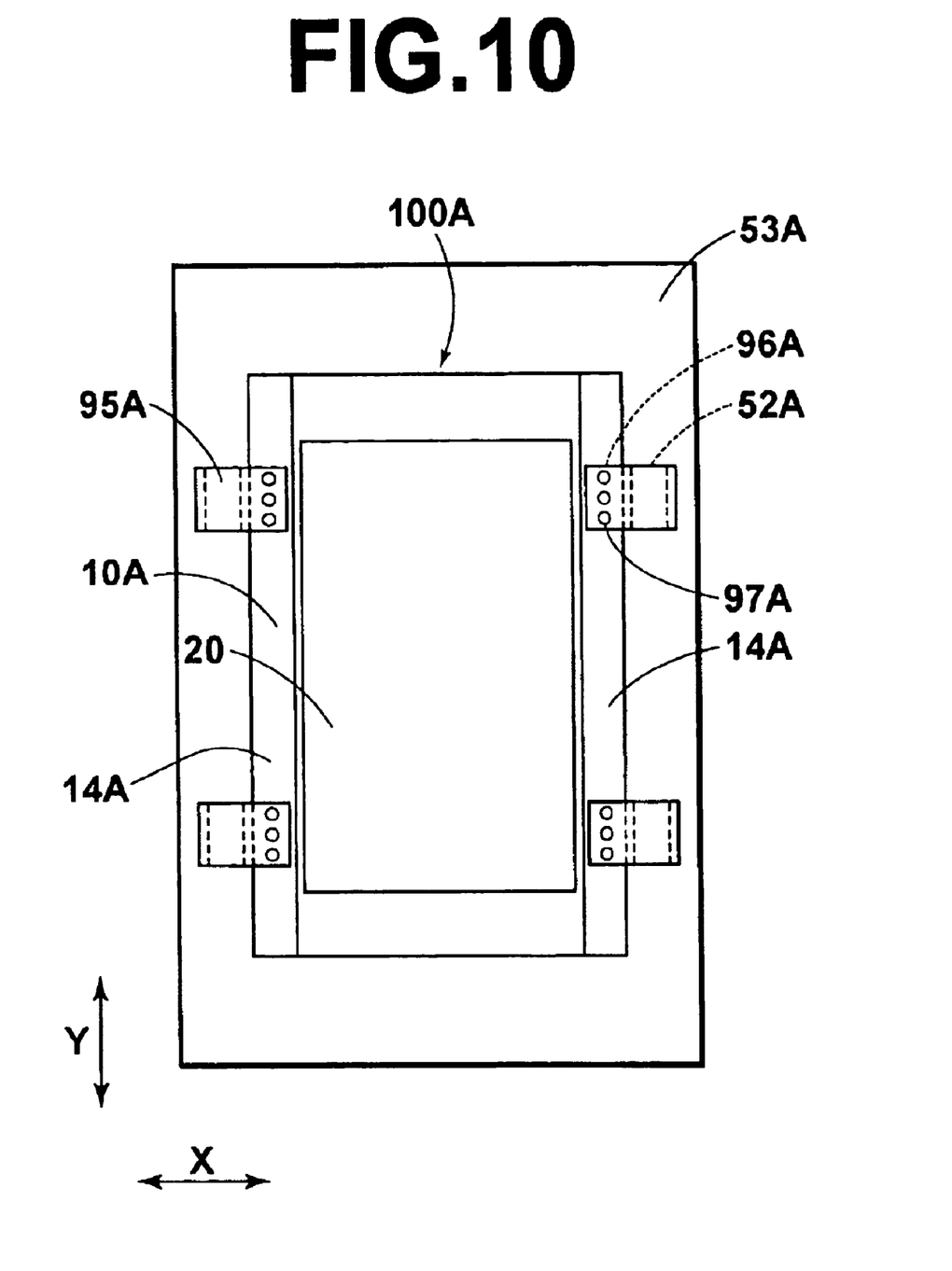
FIG. 10 is a plan view showing the state, in which the different embodiment of the stimulable phosphor panel in accordance with the present invention has been located on the base of the radiation image recording and read-out apparatus.

A different embodiment of the stimulable phosphor panel in accordance with the present invention, in which a position adjusting reference surface of each of position adjusting members is located at a position higher than a bottom surface of the stimulable phosphor panel, will be described hereinbelow with reference to FIGS. 9A, 9B and FIG. 10. FIG. 9A is a front view showing a state of a different embodiment of the stimulable phosphor panel in accordance with the present invention before being located on a base of a radiation image recording and read-out apparatus. FIG. 9B is a front view showing a state of the different embodiment of the stimulable phosphor panel in accordance with the present invention after being located on the base of the radiation image recording and read-out apparatus. FIG. 10 is a plan view showing the state, in which the different embodiment of the stimulable phosphor panel in accordance with the present invention has been located on the base of the radiation image recording and read-out apparatus.

As illustrated in FIG. 9A, four receiving sections 52A, 52A, . . . are located on the base 53 of a radiation image recording and read-out apparatus. Also, a receiving surface 59A is formed on the side of each of the receiving sections 52A, 52A, . . . , which side is opposite to the side facing the base 53. Further, a stimulable phosphor panel 100A comprises a support plate 10A and the stimulable phosphor layer 20, which is overlaid on the support plate 10A. The support plate 10A is provided with a mounting surface 14A. The mounting surface 14A is formed at a marginal area of the support plate 10A, which marginal area is located on the side of the stimulable phosphor layer 20. Also, each of four flat plates 95A, 95A, . . . , which act as the position adjusting members, is capable of being secured with one of bolts 97A, 97A, . . . to the mounting surface 14A via a spacer 96A.

Each of the flat plates 95A, 95A, . . . has a position adjusting reference surface 94A for adjustment of the position of the stimulable phosphor panel 10A at the time of the operation for locating the stimulable phosphor panel 100A in the radiation image recording and read-out apparatus. In the manner described above, the stimulable phosphor panel 100A is provided with the flat plates 95A, 95A, . . . respectively having the position adjusting reference surfaces 94A, 94A, . . . , such that the flat plates 95A, 95A, . . . are capable of being displaced. Specifically, the position of each of the flat plates 95A, 95A, . . . is capable of being displaced by alteration of the thickness of the spacer 96A. In this manner, the spacing between the position adjusting reference surface 94A of each of the flat plates 95A, 95A, . . . and the surface 21 of the stimulable phosphor layer 20 is capable of being adjusted.

More specifically, the receiving sections 52A, 52A, are located on the base 53, such that a plane H, which is parallel with the plane passing through the receiving surfaces 59A, 59A, . . . of the four receiving sections 52A, 52A, . . . and is formed on the side opposite to the side of the base 53 and at a position spaced by a spacing D1 from the plane passing through the receiving surfaces 59A, 59A, . . . of the four receiving sections 52A, 52A, . . . coincides with the surface for the readout of the radiation image and the recording surface in the radiation image recording and read-out apparatus. Also, the stimulable phosphor panel 100A provided with the flat plates 95A, 95A, . . . is adjusted previously, such that a spacing W3 between the surface 21 of the stimulable phosphor layer 20 of the stimulable phosphor panel 100A and the position adjusting reference surface 94A of each of the flat plates 95A, 95A, . . . becomes equal to the spacing D1 described above. In this manner, when the stimulable phosphor panel 100A is located in the radiation image recording and read-out apparatus, a particular operation for adjusting the position of the stimulable phosphor panel 100A need not be performed, and the surface 21 of the stimulable phosphor layer 20 is capable of being located at the plane H, which acts as the surface for the readout of the radiation image and the recording surface in the radiation image recording and read-out apparatus.

Figure 11:
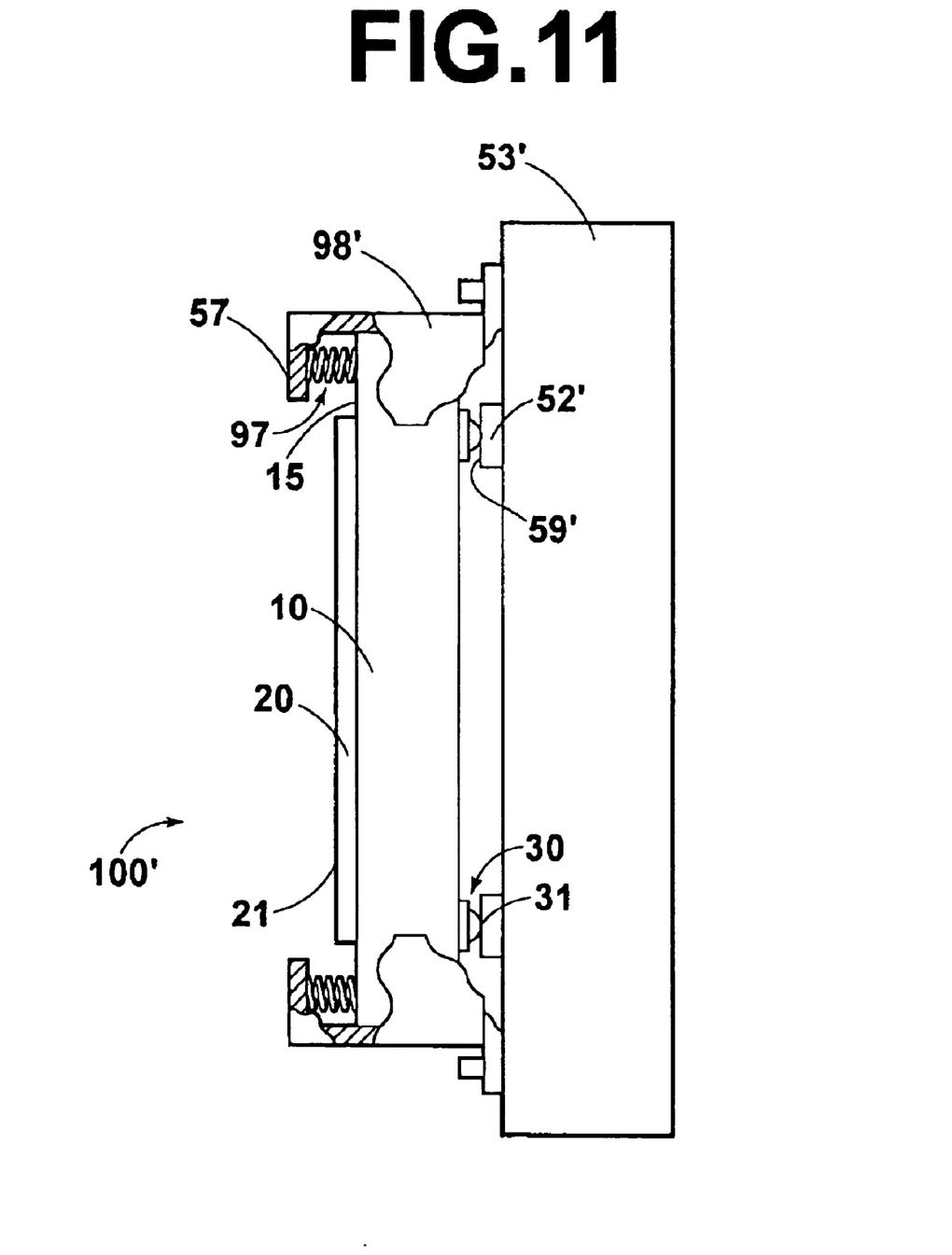
FIG. 11 is a schematic view showing how the stimulable phosphor panel shown in FIG. 5B is located in a radiation image recording and read-out apparatus, such that the surface of the stimulable phosphor layer of the stimulable phosphor panel is normal to the horizontal direction.

FIG. 11 is a schematic view showing how the stimulable phosphor panel shown in FIG. 5B is located in a radiation image recording and read-out apparatus, such that the surface of the stimulable phosphor layer of the stimulable phosphor panel is normal to the horizontal direction. As illustrated in FIG. 11, in cases where the stimulable phosphor panel 100', in which the position adjusting members 30, 30, . . . and the support plate 10 have been combined into an integral body, and in which the position adjusting members 30, 30, . . . have been set such that the spacing W between the position adjusting reference surface 31 of each of the position adjusting members 30, 30, . . . and the surface 21 of the stimulable phosphor layer 20 coincides with the predetermined spacing, is located in an radiation image recording and read-out apparatus and in an orientation such that the surface 21 of the stimulable phosphor layer 20 is parallel with the gravity direction, the position adjusting reference surface 31 of each of the position adjusting members 30, 30, . . . of the stimulable phosphor panel 100' may be pushed against a receiving surface 59' of each of receiving sections 52', 52', . . . , which are formed on a base 53' of the radiation image recording and read-out apparatus, the pushing being performed horizontally with a force approximately equal to the gravity. In this manner, the stimulable phosphor panel 100' may be located in the radiation image recording and read-out apparatus. As the pushing force, for example, a counter-force of resilient deformation of a coiled spring 97 may be utilized. Specifically, a receiving plate 57 extends from an end area of each of side plates 98', 98', . . . secured to a base 53', which end area is located on the side opposite to the end area that stands facing the base 53'. The receiving plate 57 extends in parallel with the surface 21 of the stimulable phosphor layer 20. The coiled spring 97 described above is located with the expanding-contracting direction coinciding with the horizontal direction, such that one end of the coiled spring 97 is supported by the receiving plate 57, and such that the other end of the coiled spring 97 is supported by a surface 15 of the support plate 10.

In the embodiments described above, the stimulable phosphor panel is located in the radiation image recording and read-out apparatus. In cases where the stimulable phosphor panel is to be located in a radiation image read-out apparatus for performing only the operation for reading out the radiation image from the stimulable phosphor panel, the operation for locating the stimulable phosphor panel in the radiation image read-out apparatus is capable of being performed in the same manner as that in the embodiment described above.

What is claimed is:

1. A stimulable phosphor panel, comprising:
   i) a support plate, and
   ii) a stimulable phosphor layer, which is overlaid on the support plate,
   the stimulable phosphor panel being adapted to be located in a radiation image read-out apparatus capable of performing a radiation image read-out operation for reading out a radiation image, which has been stored on the stimulable phosphor layer of the stimulable phosphor panel,
   wherein the stimulable phosphor panel is provided with position adjusting members, each of which has a position adjusting reference surface for adjustment of a position of the stimulable phosphor panel at the time of an operation for locating the stimulable phosphor panel in the radiation image read-out apparatus, such that the position adjusting members are capable of being displaced, and
   a spacing between the position adjusting reference surface of each of the position adjusting members and a surface of the stimulable phosphor layer is capable of being adjusted with an operation for displacing each of the position adjusting members.

2. A stimulable phosphor panel as defined in claim 1 wherein the stimulable phosphor panel is adapted to be located in the radiation image read-out apparatus, which is constituted as a radiation image recording and read-out apparatus capable of performing both the radiation image read-out operation and a radiation image recording operation for recording the radiation image on the stimulable phosphor panel located in the radiation image read-out apparatus.

3. A stimulable phosphor panel as defined in claim 2 wherein the support plate has internally threaded holes, which are open at a bottom surface of the support plate,
   each of the position adjusting members comprises an external thread section, which is engaged with one of the internally threaded holes of the support plate, and a bottom surface section, which is formed under the external thread section, and
   a bottom end face of the bottom surface section of each of the position adjusting members acts as the position adjusting reference surface.

4. A stimulable phosphor panel as defined in claim 2 wherein the support plate has through-holes,
   each of the position adjusting members is constituted of a micrometer head, whose shaft is inserted into one of the through-holes of the support plate, and
   a bottom end of the shaft of the micrometer head acts as the position adjusting reference surface.

5. A stimulable phosphor panel as defined in claim 2 wherein the support plate has holes, which are open at a bottom surface of the support plate,
   each of the position adjusting members is constituted of a block, which is inserted into one of the holes of the support plate, and a spacer, which is inserted between the block and the support plate, and
   a bottom end face of the block acts as the position adjusting reference surface.

6. A stimulable phosphor panel as defined in claim 2 wherein the support plate is provided with a mounting surface, which is formed at a marginal area of the support plate, the marginal area being located on the side of the stimulable phosphor layer,
   each of the position adjusting members is constituted of a flat plate, which is capable of being fitted to the mounting surface via a spacer, and
   a bottom surface of the flat plate acts as the position adjusting reference surface.

7. A stimulable phosphor panel as defined in claim 1 wherein the support plate has internally threaded holes, which are open at a bottom surface of the support plate,
   each of the position adjusting members comprises an external thread section, which is engaged with one of the internally threaded holes of the support plate, and a bottom surface section, which is formed under the external thread section, and
   a bottom end face of the bottom surface section of each of the position adjusting members acts as the position adjusting reference surface.

8. A stimulable phosphor panel as defined in claim 1 wherein the support plate has through-holes,
   each of the position adjusting members is constituted of a micrometer head, whose shaft is inserted into one of the through-holes of the support plate, and
   a bottom end of the shaft of the micrometer head acts as the position adjusting reference surface.

9. A stimulable phosphor panel as defined in claim 1 wherein the support plate has holes, which are open at a bottom surface of the support plate,
   each of the position adjusting members is constituted of a block, which is inserted into one of the holes of the support plate, and a spacer, which is inserted between the block and the support plate, and
   a bottom end face of the block acts as the position adjusting reference surface.

10. A stimulable phosphor panel as defined in claim 1 wherein the support plate is provided with a mounting surface, which is formed at a marginal area of the support plate, the marginal area being located on the side of the stimulable phosphor layer,
    each of the position adjusting members is constituted of a flat plate, which is capable of being fitted to the mounting surface via a spacer, and
    a bottom surface of the flat plate acts as the position adjusting reference surface.

* * * * *